July 14, 1931.  Y. H. KURKJIAN  1,814,713
DEVICE FOR THE REMOVAL OF ARTICLES FROM FORMERS
Filed March 14, 1930  5 Sheets-Sheet 1

INVENTOR
Yervant H. Kurkjian
BY
ATTORNEY

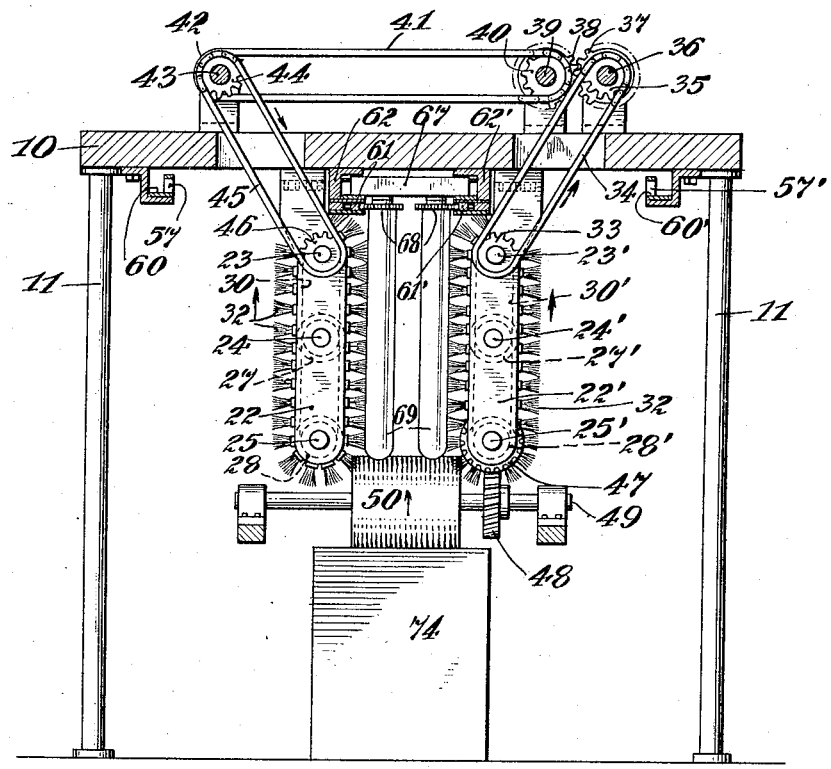
Fig. 3.
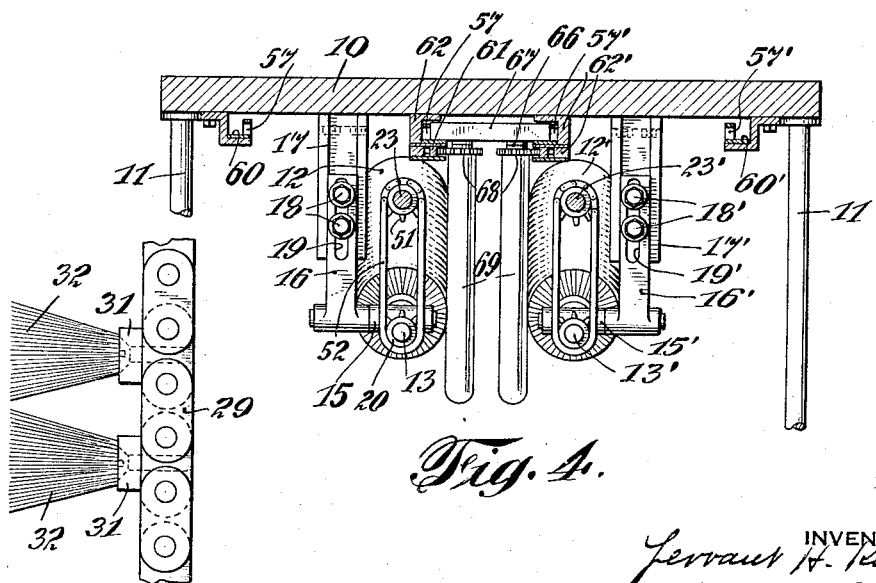
Fig. 4.
Fig. 5.

July 14, 1931. Y. H. KURKJIAN 1,814,713
DEVICE FOR THE REMOVAL OF ARTICLES FROM FORMERS
Filed March 14, 1930 5 Sheets-Sheet 4
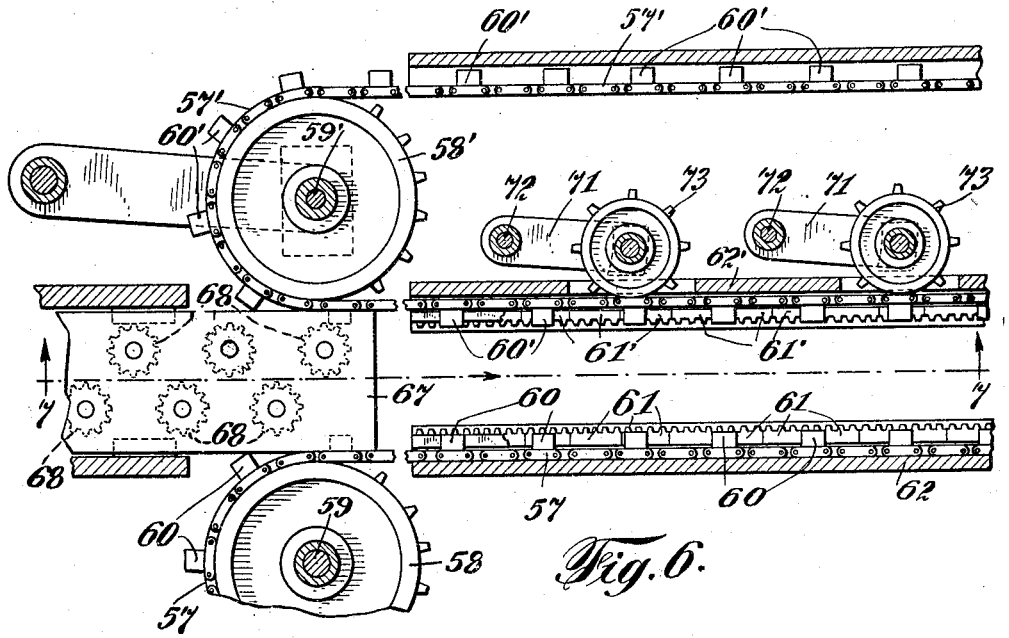
Fig. 6.
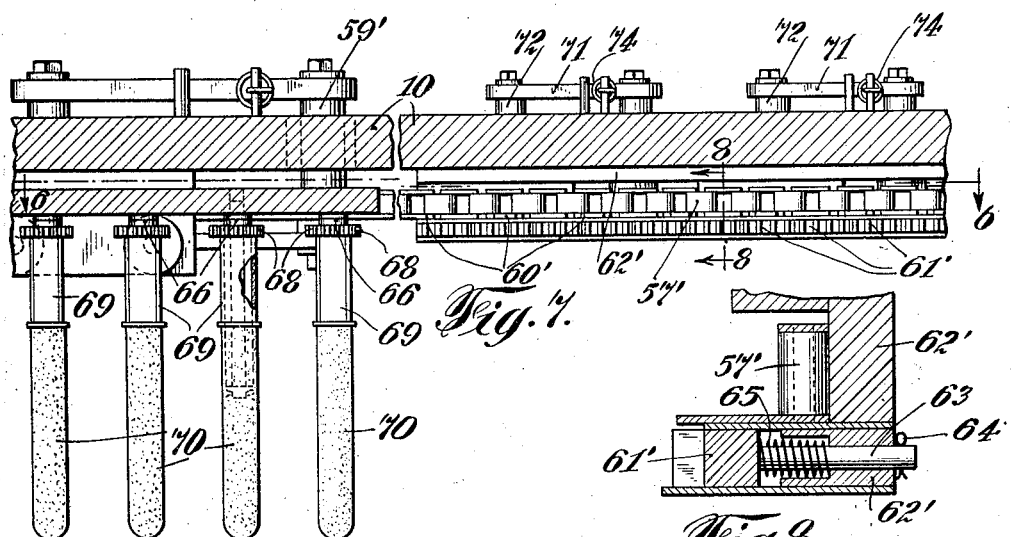
Fig. 7.
Fig. 8.
INVENTOR
BY
ATTORNEY

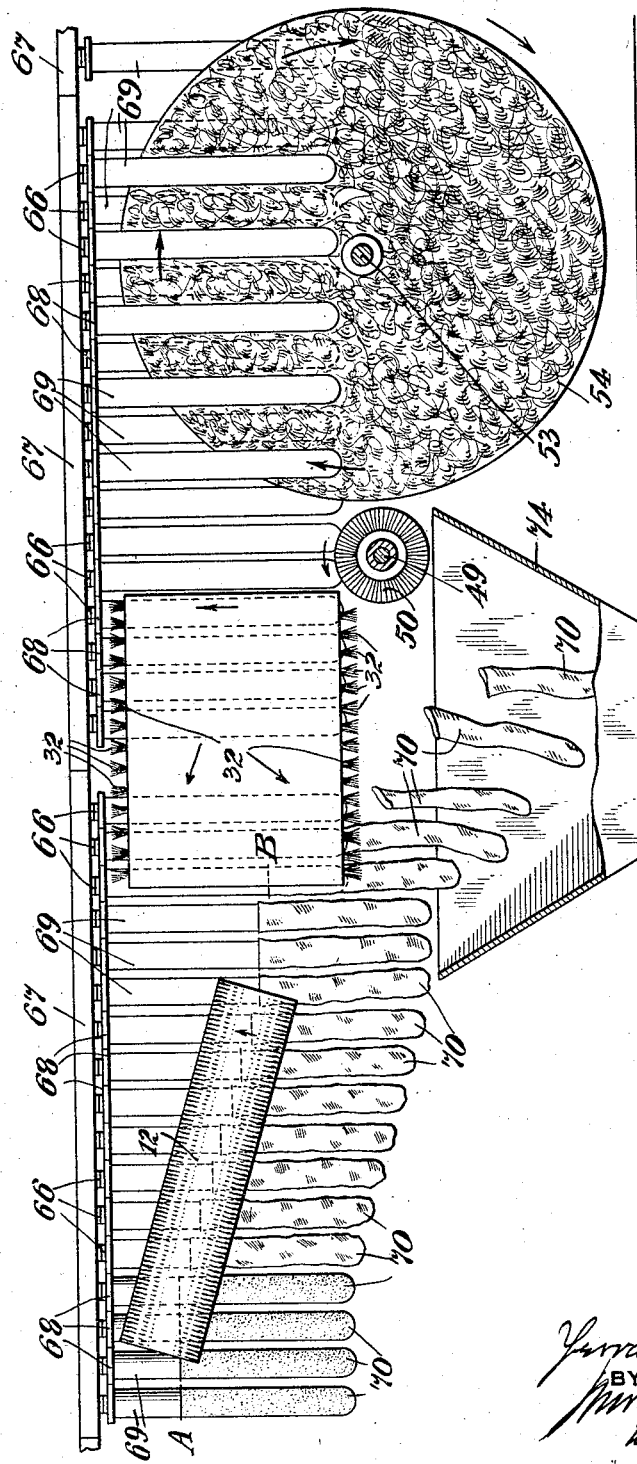

Patented July 14, 1931

1,814,713

UNITED STATES PATENT OFFICE

YERVANT H. KURKJIAN, OF HAWTHORNE, NEW JERSEY, ASSIGNOR TO CARL J. SCHMID, INC., OF NEW YORK, N. Y., A CORPORATION OF NEW YORK

DEVICE FOR THE REMOVAL OF ARTICLES FROM FORMERS

Application filed March 14, 1930. Serial No. 435,948.

My invention relates to devices for the removal of rubber articles from formers carrying said articles and refers particularly to rubber finger cots, balloons and similar articles.

Articles of the mentioned character are produced by immersing formers, generally of glass, into a rubber solution until a film of rubber of the desired thickness and character are deposited thereon.

The rubber is then vulcanized upon the formers and removed therefrom.

As these articles are extremely thin and delicate and as they have a tendency to adhere to the formers, the greatest care must be exercised in removing them.

I have found that if these formers carrying the articles are revolved around their vertical axis and passed during their revolution across the face of an inclined revolving brush until a portion of each article is removed from a portion of its former and that then the revolving form and its article be passed across the face of a revolving brush the axis of which is in a horizontal plane at right angles to the longitudinal axis of the former, the article will be readily removed from the former and that the article when thus removed is in open condition instead of in a rolled up condition which results when the article is completely removed by the inclined brushes.

The employment of the last mentioned revolving brush of my device has many practical advantages and presents a greatly improved method of accomplishing the desired results.

When the articles are completely removed from their formers by means of inclined brushes they are rolled up and turned inside out during their removal which necessitates considerable manual labor in reversing each one of them for commercial purposes. By means of my device the articles are removed in reversed condition but are not rolled as are those removed solely by inclined brushes and hence their reversal into commercial condition is greatly facilitated.

A further disadvantage in removing the articles by inclined brushes is that as the formers for some articles are of considerable length, the pressure of the inclined brush upon the extremity of the former forces it from its natural vertical position. As the article fits tightly upon the face of the former, and as because of its delicate composition and condition it is absolutely essential that it be removed as regularly and uniformly as possible to prevent its being torn, it is evident that this distortion of the former from its normal position during a part of the removal will result in the destruction of numerous articles.

In my device, the inclined brush operates only upon that portion of the former adjacent to its point of fixed connection with the platform by which it is carried and hence there is no distortion of the position of the former, and the remainder of the removal is accomplished by a revolving brush which abuts upon the former not only at its extended portion removed from its fixed point, but upon practically the entire former, or upon a very considerable portion of it, and hence the former is maintained in its normal vertical position during the entire removal operation.

When the former is subjected to inclined brushes only, that portion of the former from which the article has been removed is not subjected to any brush action and hence is not cleansed from deleterious materials which may be thereon. In the employment of my vertically revolving brush, however, the entire side face of the former is being constantly cleansed during the removal process, and my brush continually abuts upon the side face of the former from which the article has been removed. As it is essential that the former be absolutely clean in order to allow a proper deposit of rubber thereon, and as materials are added to assist the removal which materials interfere with the proper deposit of rubber upon the formers, the value of my device is evident.

I have further found that improved results can be obtained by entirely dispensing with the inclined brushes and employing only those in which the brush bristles move in a plane parallel to the longitudinal axis of the former, as shown and described, but I prefer to use both kinds of brushes.

The above mentioned and other valuable attributes of my device will be evident upon a consideration of my specification and its accompanying drawings.

In the accompanying drawings illustrating one form of the device of my invention similar parts are designated by similar numerals.

Figure 3 is a section on the line 3—3 of Figure 1.

Figure 4 is a section on the line 4—4 of Figure 1.

Figure 5 is an enlarged fragmentary side view of one of the curtain brushes.

Figure 6 is a horizontal sectional elevation of the feeding end of my device taken on lines 6—6 of Figure 7.

Figure 7 is a section on the line 7—7 of Figure 6.

Figure 8 is an enlarged section on the line 8—8 of Figure 7.

Figure 9 is a diagrammatic side view of my device illustrating the removal of the articles during the operation of the device.

Figure 1:
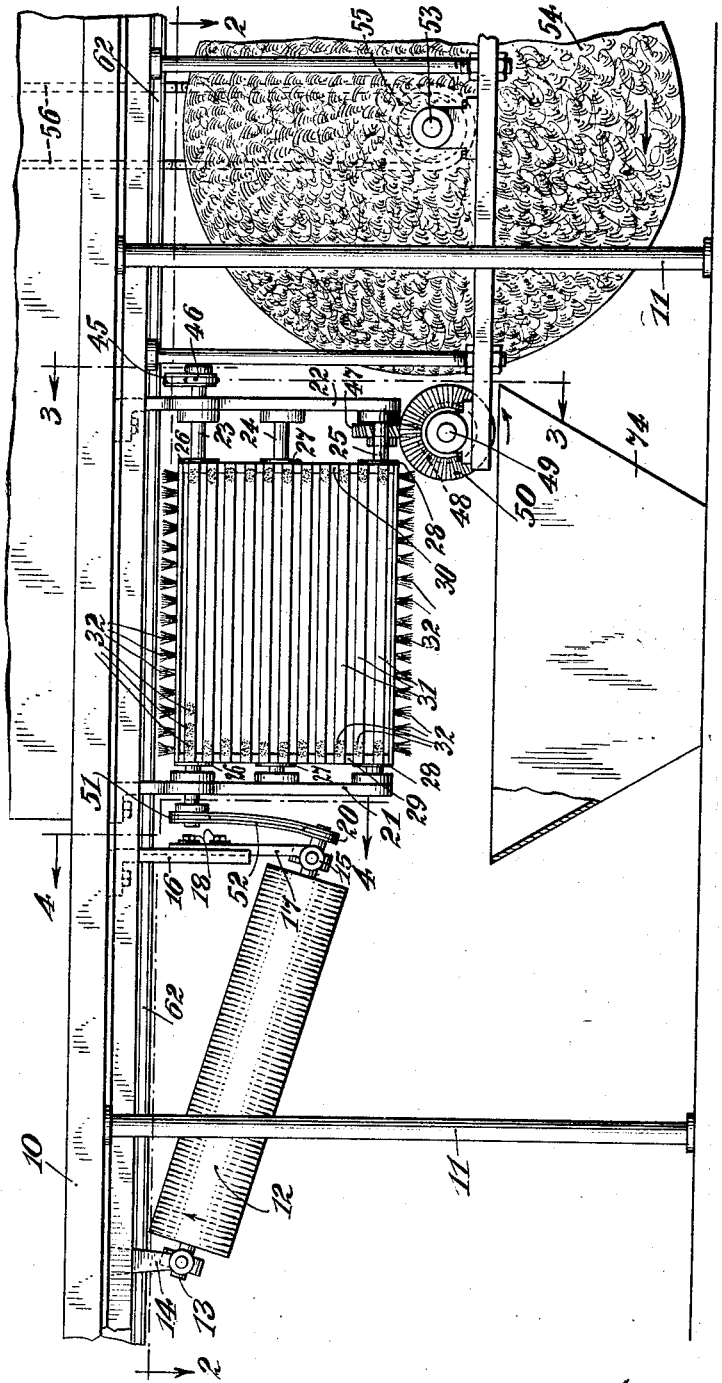
Figure 1 is a fragmentary side view of one form of the device of my invention.
Figure 2:
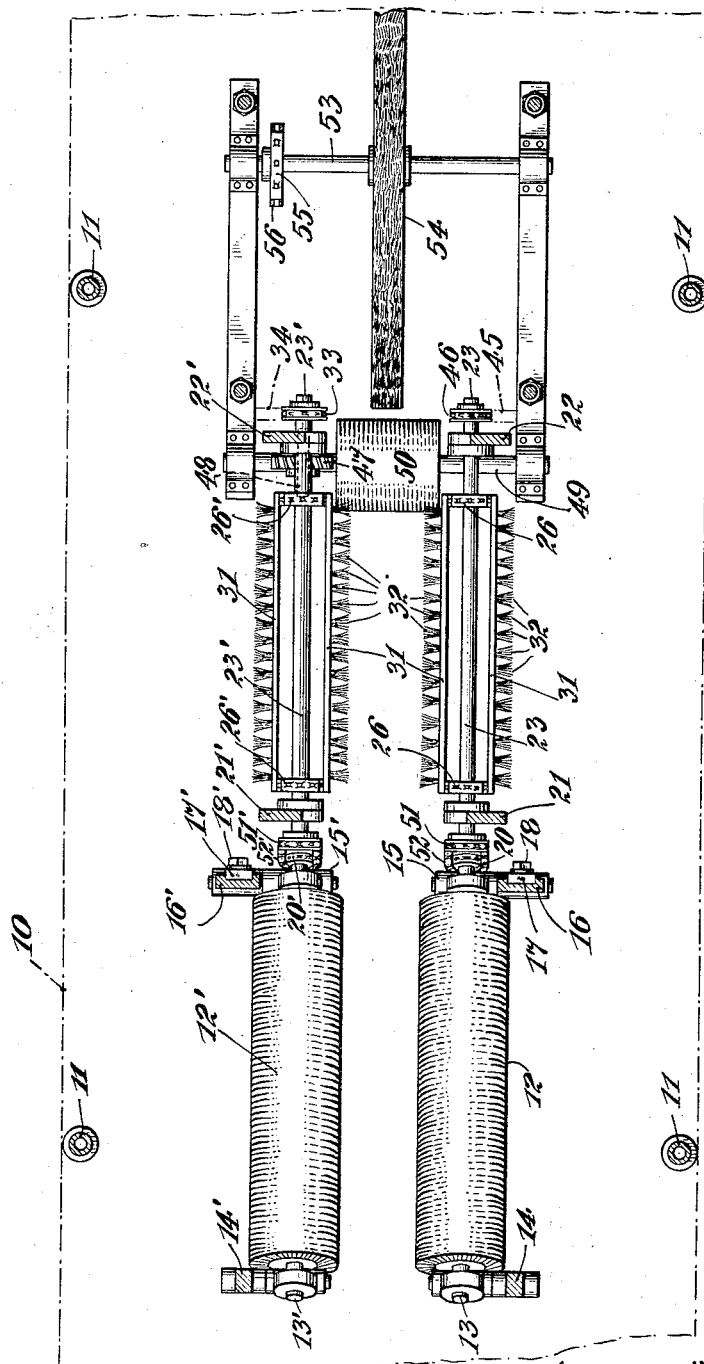
Figure 2 is a section on the line 2—2 of Figure 1.

The particular form of the device of my invention shown in the accompanying drawings comprises a table 10, supported by the legs 11, 11.

Supported below the table top 10 are two parallel revoluble inclined brushes 12 and 12′, and as these brushes and their operative mechanisms correspond with each other, for purposes of clearness of description, I will describe one of them, the other being designated upon the drawings with corresponding prime numerals.

The shaft 13 of the brush 12 is pivotally carried by the hanger 14 which in turn is carried by the top 10. The other end of the shaft 13 is carried by the sleeve 15 which is pivotally attached to the vertically extended arm 16, which in turn is carried by the hanger 17 carried by the top 10. The hanger 17 is channel shaped within which the arm 16 is slidable, attachment between the two being accomplished by means of bolts 18, 18, passing through holes in the hangers and an elongated slot 19 in the arm 16. By these means the lower end of the brush 12 may be raised and lowered as desired and fixedly positioned at any desired height. The shaft 13 carries a sprocket 20.

Two pairs of spaced parallel hangers 21, 22 and 21′, 22′ are attached to the top 10 and as they correspond I will describe one pair of these hangers and their operating parts, and indicate the corresponding parts of the other pair of hangers and their operating parts by means of prime numerals.

The hangers 21 and 22 carry three revoluble shafts 23, 24, 25, each carrying at each end sprockets 26, 27 and 28.

The chain belts 29 and 30 passing around and meshing with the sprockets 26, 26 and 28, 28 carry connecting slat members 31, 31 each of which carries a plurality of brushes 32, 32 and there is thus formed a revoluble curtain brush. The sprockets 27, 27 tend to keep the curtain brush taut.

The sprocket 33 is connected by means of the chain belt 34 to the sprocket 35 carried by the drive shaft 36. The gear 37 carried by the shaft 36 meshes with the gear 38 carried by the shaft 39. The sprocket 40 carried by the shaft 39 is connected by means of the chain belt 41 to the sprocket 42 carried by the shaft 43. The sprocket 44 carried by the shaft 43 is connected by means of the chain belt 45 to the sprocket 46 carried by the shaft 23. The revolution of the drive shaft 36, therefore, will revolve the two curtain brushes in opposite directions.

The shaft 25′ carries the spiral gear 37 meshing with the gear 48 carried by the shaft 49, which latter carries the brush 50.

The shaft 23 carries a sprocket 51 which is connected to the sprocket 20 of the shaft 13 by means of the chain belt 52.

The shaft 53 carries the felt wheel 54 and the sprocket 55, the latter being connected to a source of revoluble power, not shown, by means of the chain belt 56.

The moving and revolving mechanism of the forms comprises two chain belts 57 and 57′, meshing with the sprockets 58 and 58′ carried by the revoluble shaft 59 and 59′, the chains passing over similar sprockets at the other end portion of the device, not shown. Both chains carry special supporting links 60, 60′.

The table carries two spaced opposed series of racks 61, 61, 61′, 61′.

The chain belts 57, 57′ and the racks 61, 61′ are supported beneath the table top by the two spaced parallel supports 62, 62′.

A pair of pins as 63 carried by each rack section passes through an opening in its support 52, and is retained from dislodgement by the cotter-pin 64. A spring 65 carried by each pin 63 tends to press the rack outwardly.

A plurality of former supports 66, 66 are attached to a platform 67, each former support carrying a pinion 68, capable of meshment with the series of rack sections. Each former support carries a former 69, preferably of glass, the article 70 having been produced on the former.

A plurality of arms 71 pivotally carried at 72, carry each a sprocket 73 meshable with the chain 57, springs 74 pressing the sprockets 73 against the chain.

The operation of the device is as follows:—

The several brushes, the felt wheel 54 and the chains 57 and 57' are put into motion and a platform 67 carrying its formers with the rubber articles thereon is moved forwardly until it rests upon the supports 60, 60, 60', 60' of the chains 57, 57' which then carry it forwardly, the sprockets 73, 73 forcing the chain against the sides of the platform in order to insure a regular movement of the latter. This movement of the platform causes the pinions 68, 68 to mesh with the rack sections 61, 61, 61', 61' thus revolving the formers. The springs 65, 65 cause the pinions to enter the racks and overcome any inequalities there may be in the platforms or in the positions of the formers thereon.

The action upon the articles carried by the formers during this moving operation is as follows, as is shown in Figure 9, in which the dash-line A—B represents diagrammatically the upper extremity of the article 70 as it is gradually removed from its former 69:

The brush 12 gradually removes the article 70 until it, the upper extremity thereof, has reached approximately mid-way of the former. It is evident that if this brush 12 were continued until it extended to the bottom of the former, the pressure upon the lower portion of the former would press it from its normal vertical position, thus causing an uneven removal of the article resulting in tearing or destroying it.

The revolving formers are now brought into contact with the revolving and downwardly moving curtain brush 32 which presses equally upon practically the entire side face of each former, the articles being removed from the formers and dropping into the chute 74 for further operations.

It will be noted that if the entire removal was accomplished by an inclined brush 12, that portion of the former above the article would not be cleaned, while in my device the curtain apron cleans the entire side face of the formers, the brush 50 cleans the closed ends of the formers and the felt wheel 54 gives them a final cleaning and polishing treatment.

It will be further noted that the articles are removed in a practically open condition, instead of being rolled up or turned inside out.

I do not limit myself to the particular size, shape, number, material or arrangements of parts as shown and described as these are given simply as a means for clearly describing the device of my invention.

What I claim is:—

1. In an article removing device, in combination, a revoluble former, means capable of revolving said former, a revoluble curtain brush the axis of which is in a plane at right angles to the longitudinal axis of the former, means capable of revolving said brush, and means capable of moving said revolving former across the abutting face of the revolving brush.

2. In an article removing device, in combination, a revoluble vertical former, means capable of revolving said former around its longitudinal axis; a revoluble curtain brush the axis of which is in a horizontal plane at right angles to the longitudinal axis of the former, means capable of revolving said brush and means capable of moving said revolving former across the abutting face of the revolving brush.

3. In an article removing device, in combination, a revoluble vertical former, means capable of revolving said former around its longitudinal axis; a revoluble curtain brush the axis of which is in a horizontal plane at right angles to the longitudinal axis of the former, means capable of revolving said brush and means capable of moving said revolving former across the abutting face of the revolving brush and causing said brush to simultaneously abut upon the greater portion of the longitudinal length of said former.

4. In an article removing device, in combination, a platform, a plurality of revoluble formers carried by said platform, means capable of revolving said formers, a plurality of spaced revoluble curtain brushes the axis of each brush being in a plane at right angles to the longitudinal axis of the formers, means capable of revolving said brushes, and means capable of moving said platform between said brushes causing said revolving brushes to abut upon the faces of said revolving formers.

5. In an article removing device, in combination, a platform, a plurality of revoluble vertical formers carried by said platform, means capable of revolving said formers around their vertical longitudinal axis, a plurality of spaced revoluble curtain brushes the axes of which are in horizontal planes at right angles to the longitudinal axes of the formers, means capable of revolving said brushes, and means capable of moving said platform between said brushes causing said revolving brushes to abut upon the faces of said revolving formers.

6. In an article removing device, in combination, a platform, a plurality of revoluble formers carried by said platform, means capable of revolving said formers, a plurality of spaced revoluble curtain brushes the axis of each brush being in a plane at right angles to the longitudinal axis of the formers, means capable of revolving said brushes, and means capable of moving said platform between said brushes causing said revolving brushes to abut upon the faces of said revolving formers and causing each of said brushes to simultaneously abut upon the greater portion of the longitudinal length of a former.

7. In an article removing device, in combination, a platform, a plurality of revoluble vertical formers carried by said platform, means capable of revolving said formers around their vertical longitudinal axis, a plurality of spaced revoluble curtain brushes the axis of which are in horizontal planes at right angles to the longitudinal axis of the formers, means capable of revolving said brushes, and means capable of moving said platform between said brushes causing said revolving brushes to abut upon the faces of said revolving formers and causing each of said brushes to simultaneously abut upon the greater portion of the longitudinal length of a former.

8. In an article removing device, in combination, a revoluble vertical former, a pinion carried by said former, a rack capable of meshment with said pinion, a revoluble curtain brush the axis of which is in a horizontal plane at right angles to the vertical axis of the former, means capable of revolving said brush, and means for moving said former causing said rack and pinion to revolve said former and cause it to move across the abutting face of said revolving brush.

9. In an article removing device, in combination, a revoluble vertical former, a pinion carried by said former, a rack capable of meshment with said pinion, a revoluble curtain brush the axis of which is in a horizontal plane at right angles to the vertical axis of the former, means capable of revolving said brush, and means for moving said former causing said rack and pinion to revolve said former and cause it to move across the abutting face of said revolving brush, and causing said brush to simultaneously abut upon the greater portion of the longitudinal length of said former.

10. In an article removing device, in combination, a platform, a plurality of revoluble vertical formers carried by said platform, a pinion carried by each said former, a rack capable of meshment with said pinions, a plurality of spaced revoluble curtain brushes, the axis of each of which is in a horizontal plane at right angles to the vertical axis of the formers, means capable of revolving said brushes, and means capable of moving said platform between said brushes causing said racks and pinions to revolve said formers and cause them to move across the abutting face of said revolving brushes.

11. In an article removing device, in combination, a platform, a plurality of revoluble vertical formers carried by said platform, a pinion carried by each said former, a rack capable of meshment with said pinions, a plurality of spaced revoluble curtain brushes, the axis of each of which is in a horizontal plane at right angles to the vertical axis of the formers, means capable of revolving said brushes, and means capable of moving said platform between said brushes causing said racks and pinions to revolve said formers and cause them to move across the abutting face of said revolving brushes and causing each of said brushes to simultaneously abut upon the greater portion of the longitudinal length of a former.

12. In an article removing device, in combination, a platform, a plurality of revoluble vertical formers carried by said platform, a pinion carried by each said former, a spring operated rack capable of meshment with said pinions, a plurality of spaced revoluble curtain brushes, the axis of each of which is in a horizontal plane at right angles to the vertical axis of the formers, means capable of revolving said brushes and means capable of moving said platform between said brushes causing said racks and pinions to revolve said formers and cause them to move across the abutting face of said revolving brushes and causing each of said brushes to simultaneously abut upon the greater portion of the longitudinal length of a former.

13. In an article removing device, in combination, a revoluble vertical former, means capable of revolving said former around its longitudinal axis, an inclined revoluble brush abuttable upon said former, means for revolving said inclined brush, a revoluble curtain brush the axis of which is in a horizontal plane at right angles to the longitudinal axis of the former, means capable of revolving said brush and means capable of moving said revolving former across the abutting face of the revolving brush.

14. In an article removing device, in combination, a revoluble vertical former, means capable of revolving said former around its longitudinal axis, an inclined revoluble brush abuttable upon said former, means for revolving said inclined brush, a revoluble curtain brush the axis of which is in a horizontal plane at right angles to the longitudinal axis of the former, means capable of revolving said brush and means capable of moving said revolving former across the abutting face of the revolving brush and causing said brush to simultaneously abut upon the greater portion of the longitudinal length of said former.

15. In an article removing device, in combination, a platform, a plurality of revoluble vertical formers carried by said platform, a pinion carried by each said former, a rack capable of meshment with said pinions, a plurality of inclined revoluble brushes abuttable upon said formers, means for revolving said inclined brushes, a plurality of spaced revoluble curtain brushes, the axis of each of which is in a horizontal plane at right angles to the vertical axis of the formers, means capable of revolving said brushes, and means capable of moving said platform between said brushes causing said racks and pinions to revolve said formers and cause them to move across the abutting face of said revolving brushes and causing each of said brushes to simultaneously abut upon the greater portion of the longitudinal length of a former.

16. In an article removing device, in combination, a platform, a plurality of revoluble vertical formers carried by said platform, a pinion carried by each said former, a spring operated rack capable of meshment with said pinions, a plurality of inclined revoluble brushes abuttable upon said formers, means for revolving said inclined brushes, a plurality of spaced revoluble curtain brushes the axis of each of which is in a horizontal plane at right angles to the vertical axis of the formers, means capable of revolving said brushes, and means capable of moving said platform between said brushes causing said racks and pinions to revolve said formers and cause them to move across the abutting face of said revolving brushes and causing each of said brushes to simultaneously abut upon the greater portion of the longitudinal length of a former.

Signed at New York in the county of New York and State of New York this 5 day of March, 1930.

YERVANT H. KURKJIAN.